Figure 1:
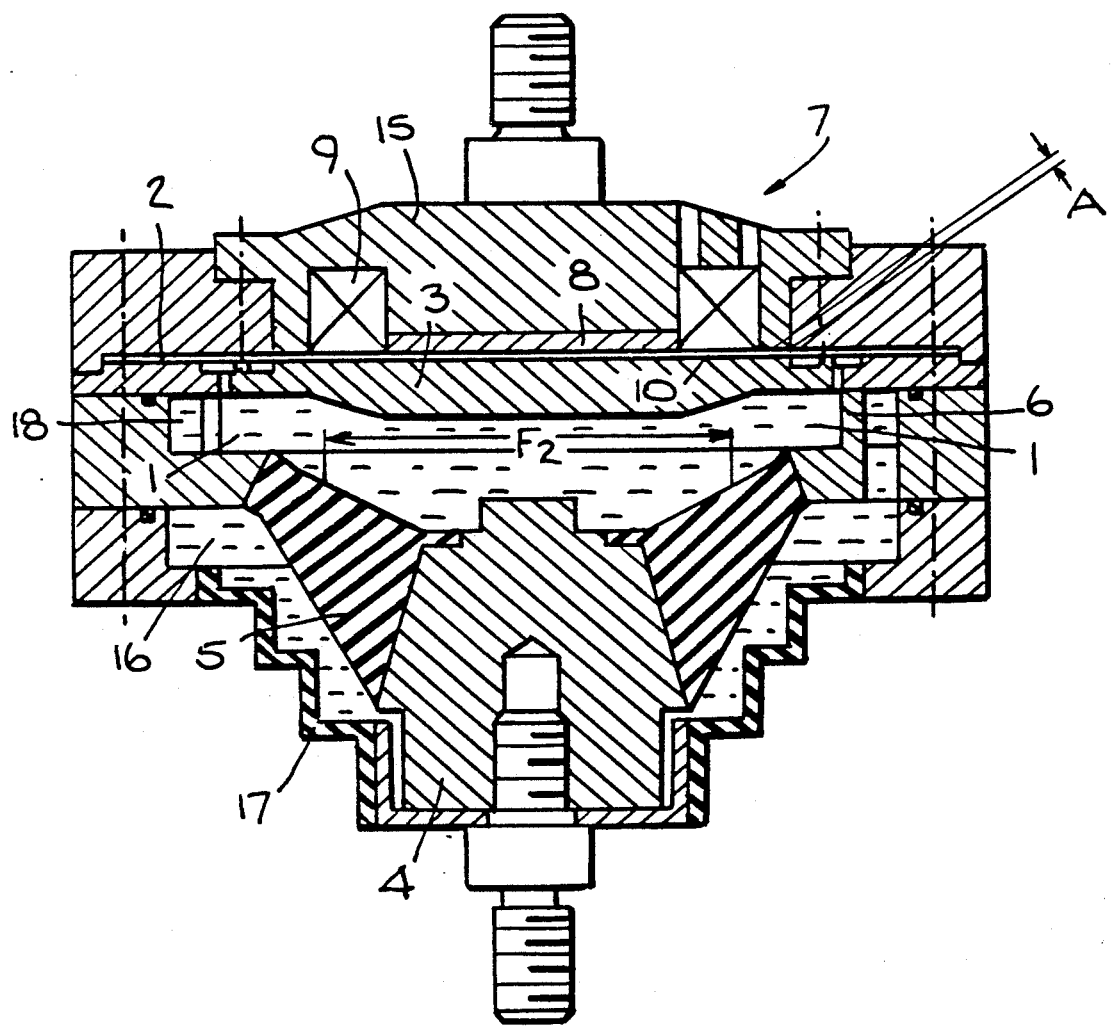

United States Patent [19]
Freudenberg et al.

[11] Patent Number: 5,042,786
[45] Date of Patent: Aug. 27, 1991

[54] HYDRAULICALLY DAMPED RUBBER MOUNTING

[75] Inventors: Tillman Freudenberg, Weinheim; Ulrich Freudenberg, Hirschberg, both of Fed. Rep. of Germany

[73] Assignee: Firma Carl Freudenberg, Weinheim/Bergstr, Fed. Rep. of Germany

[21] Appl. No.: 471,151

[22] Filed: Jan. 26, 1990

[30] Foreign Application Priority Data

Jun. 8, 1989 [DE] Fed. Rep. of Germany ....... 3918753

[51] Int. Cl.$^5$ ............................................. F16M 1/00
[52] U.S. Cl. ................................ 267/140.1; 267/219; 248/562; 248/636
[58] Field of Search ................. 248/562, 636; 267/140.1 R, 140.1 A, 140.1 AC, 218, 219; 180/300, 312, 902

[56] References Cited

U.S. PATENT DOCUMENTS 4,650,170  3/1987  Fukushima ............... 267/140.1 AE
4,793,599 12/1988  Ishioka ..................... 267/140.1 AE

FOREIGN PATENT DOCUMENTS

OS 3419437 11/1985  Fed. Rep. of Germany .
    0234143 11/1985  Japan ....................... 267/140.1 AE Primary Examiner—George E. A. Halvosa
Attorney, Agent, or Firm—Felfe & Lynch

[57] ABSTRACT

A hydraulically damped rubber mounting in which a liquid filled working chamber 1 is bounded in at least a first partial area by a plate 3 which is made of a magnetizable material and supported on a spring 2. Depending upon the parameters, the plate 3 can be moved back and forth in direction of the working chamber 1 by means of a magnetic system. The transmission of acoustically effective vibrations via the rubber mounting can thus be suppressed.

13 Claims, 2 Drawing Sheets

HYDRAULICALLY DAMPED RUBBER MOUNTING

The invention relates to a rubber mounting.

A rubber mounting of this general kind is known from German OS 34 19 437. The magnetic system includes a moving coil which is rigidly connected to the plate and an annular permanent magnet which is rigidly connected to the casing. The plate can thus be moved back and forth with a great amplitude. The transferrable forces, however, are so small that a relative displacement of liquid components contained in the working chamber is hardly possible. This is the main reason why the pressure changes in the working chamber which are caused by the introduction of acoustic vibrations cannot be compensated by activating the magnetic system.

It is an object of the invention to further develop a rubber mounting of this general kind such that the transmission of acoustically effective vibrations via the rubber mounting are suppressed in a substantially improved way.

In the rubber mounting in accordance with the invention, the permanent magnet and the magnetic coil are configured so as to be relatively inflexible with respect to one another and rigidly associated with the casing of the rubber mounting. The permanent magnet and the magnetic coil together form a lifting magnet using the plate as a magnetic short circuit. The rigidity of the spring is greater than that of the expanding spring while it is prescribed that in any operative state there is a spacing between the lifting magnet and the plate. Due to the permanent magnet, the spring is subject to a pretension and the plate approaches the permanent magnet very closely. The amplitude of velocity of the plate which can be achieved when activating the magnetic coil is correspondingly small and overridden by stronger forces. The liquid contained in the working chamber can thus be exposed to a rocking motion required for compensating acoustically effective vibrations. In this state the vibrations do not cause pressure changes in the working chamber and there is an additional contribution to the pressure integral over the internal surface of the support body which compensates the forces transferred via the structure material. As a result, the acoustical vibration forces are completely suppressed. In addition, the present magnetic system can be produced particularly inexpensively insofar that the magnetic coil and the permanent magnet form one assembly unit and can thus be manufactured and installed in a very simple way. The magnetic coil is rigidly mounted which substantially facilitates the mounting of a power supply unit.

During the use in accordance with the object, the permanent magnet causes a static flux which passes through the air gap between the coil form and the plate above which it is closed. A mechanical prestress develops at the bounding surfaces of the air gap and exposes the plate to tension. The coil is used to superimpose a modifiable flux on the static flux such that an alternating force develops in the air gap. This force serves to deflect the plate from its initial balanced position and to drive it. The alternating voltage required for this purpose is supplied to the magnetic coil from a supply unit which is controlled either rigidly or by means of sensors corresponding to the vibrations to be insulated.

With regard to its further design, the rubber mounting in accordance with the invention can correspond to any of the known types where a damping opening joins the working chamber and the compensating chamber. However, it should always be mounted such that the lifting magnet is rigidly associated with the one side of the rubber mounting where the vibrations are to be insulated.

The permanent magnet preferably has a magnetic resistance which is at least five times the size of the magnetic resistance of the gap 10 which is formed by the spacing A (FIG. 1). The magnetic system is thus imparted almost linear characteristics, and magnetic force and current are proportional to one another. Moreover, the effect of manufacturing tolerances is suppressed. The permanent magnet preferably has an energy density of at least $100 kJ/m^3$. The forces and the rigidities in the magnetic system thus achieve the necessary high values.

The magnetic coil to be used in connection with the proposed rubber mounting preferably has an inductance of 10 mH, at a maximum. Because the tolerable value of the inductance also depends on the supply voltage, no exact value can be recommended. The resistance of the alternating current of the coil thus remains so small in the entire frequency range that the current generating the alternating force does not fall below the necessary strength.

The lifting magnet can have soft magnetic parts of low reluctivity. A high specific resistance of these parts helps to avoid eddies which interfere with the action of the force and cause power loss. Silicon iron and poer materials are suitable.

The plate preferably is configured so as to meet the same requirements. It preferably also has a specific, electric resistance of at least $30 \mu\Omega$ cm in order to suppress eddies.

The plate preferably has a thickness large enough to just stay short of the saturation inductance during the use in accordance with the invention. This ensures that the plate does transmit the maximum possible flux of coil and permanent magnet and, however, does not have an unnecessarily great mass.

The spring and the effect of force of the permanent magnet can complete one another so as to form one spring unit with a rigidity which is at least twice as high as the rigidity of the expanding spring. The transmission properties of the hydraulic/elastomeric part at low frequencies and large amplitudes are thus hardly affected. In the reverse way, the magnetic system operates almost independently from the operative state of the hydraulic system.

An advantageous embodiment suggests providing the plate with an inertial mass which cooperates with the rigidity of the spring unit so as to form a vibratory system having a resonant frequency which is above the frequency of the vibrations to be insulated. A control of the mounting in a mechanical resonance range is thus avoided. The stability requirements of the parameters which determine the frequency ranges of phase angles and amplitudes are thus decreased.

Advantageously, the plate has an additional piston surface F 1 which is at least 0.5 times as large as the additional piston surface F 2 of the support body inclusive of the expanding spring. This is favorable with respect to the properties of the magnetic system—short lifting way, great force. Further, parasitic inertial effects of compensating flows inside the working chamber are avoided. Advantageously, the plate has an additional piston surface F 1 which is 1.5 times as large as the additional piston surface F 2 of the support body inclusive of the expanding spring.

A capacitor can be connected in parallel to the magnetic coil. An electric blocking circuit is thus formed with a resonance frequency which is in the frequency range of the vibrations to be insulated or just above. In the resonance range, the current required for a certain force amplitude is reduced in the feed line since, essentially, only power losses are compensated whereas the mechanical idle power is supplied from the energy contents of the blocking circuit. An ohmic resistor can also be connected in series to the magnetic coil. The transmission properties of the magnetic system are thus less dependent upon the frequency.

The rubber mounting in accordance with the invention permits a good insulation of acoustically interfering vibrations and, particularly, of structure-borne noise due to the special configuration of the magnetic system which it contains. In addition to the magnetic system, the rubber mounting has a hydraulic damping system which simultaneously permits suppressing resonance step-up vibrations of the supported machine part of too great an amplitude. For this reason, the preferred application of the rubber mounting in accordance with the invention is the bearing of combustion engines in motor vehicles.

In accordance with the invention, a hydraulically damped rubber mounting comprises a plate made of a magnetizable material, a spring, and a liquid-filled working chamber bounded in at least a first partial area by the plate braced by the spring. The mounting also includes a support body and an expanding spring which can widen and is made of an elastomeric material bounding the working chamber in at least a second partial area. The mounting also includes a rigidly configured casing bounding the working chamber at least in a third partial area. The magnetic system includes a permanent magnet and a magnetic coil for moving the plate back and forth in the direction of the working chamber. The permanent magnet and the magnetic coil are so configured as to be inflexible with respect to one another and rigidly associated with the casing. The permanent magnet and the magnetic coil form together a lifting magnet which uses the plate as a magnetic short circuit and the rigidity of the spring is greater than that of the expanding spring while it is determined that in any operative state, there is a spacing between the lifting magnet and the plate.

For a better understanding of the invention, together with other and further objects thereof, reference is made to the following description, taken in connection with the accompanying drawings, and its scope will be pointed out in the appended claims.

Figure 2:
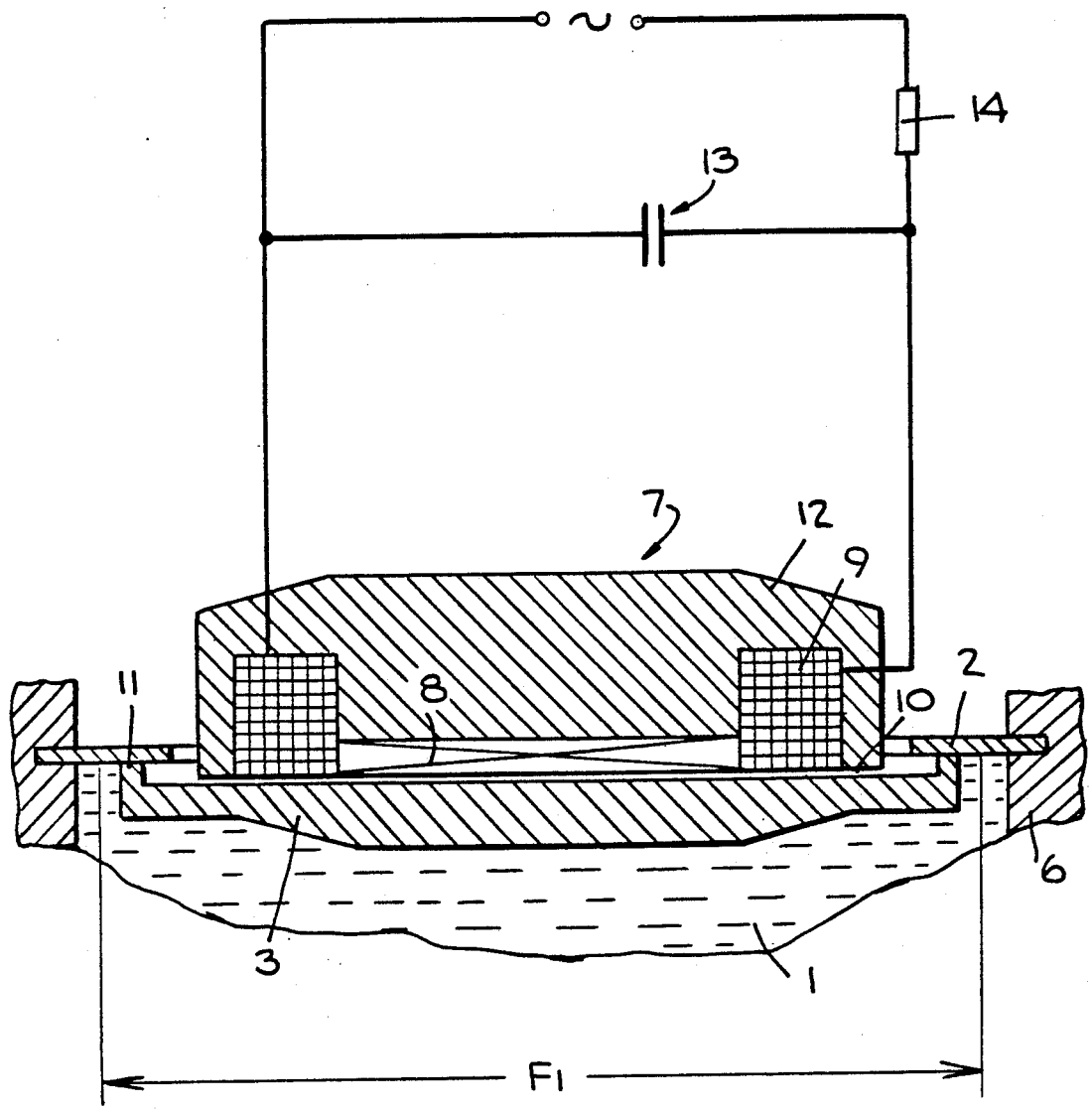

Referring now to the drawings:

FIG. 1 is a longitudinal sectional view of the rubber mounting in accordance with the invention, FIG. 2 is a fragmentary, enlarged representation of a segment of the rubber mounting of FIG. 1 showing the area of the magnetic system.

The rubber mounting of FIG. 1 is designed for the use in a motor vehicle. It includes a support body 4 which is screwed to the car body when used in accordance with the object and serves at the same to support the hollow-conical expanding spring 5 made of an elastomeric material, for example, rubber. The expanding spring 5 and the support body 4, on the one hand, and the casing 6 of the rubber mounting, on the other hand, are permanently joined to each other, for example by attaching the expanding spring 5 by means of vulcanization to metal machine parts which bound on both sides. At its bottom, the casing is self-contained and during the use in accordance with the invention, it is connected to the combustion engine to be supported. It contains a lifting magnet 7 which is downwardly effective in a vertical direction and encloses, on the one hand, the permanent magnet 8 and, on the other hand, the magnetic coil 9. The latter is rigidly supported in a groove of the support body 15. The groove surrounds the permanent magnet 8 and the support body 15 is made of soft iron.

Underneath the support body 15 and the permanent magnet 8 an annular leaf spring 2 is supported in the area of its external circumference; it engages the plate 3 made of soft iron in the area of its internal circumference and braces this plate in direction toward the permanent magnet 8 and the magnetic coil 9. The plate 3 and the spring 2 are liquid-tight connected and the elasticity of the spring 2 is adjusted to the support force of the permanent magnet 8 such that the relative mobility of the plate is not hampered when activating the magnetic coil 9. The bottom of plate 3 bounds the working chamber which is filled with a hydraulic liquid and, in other partial areas, is bounded by the casing 6, the expanding spring 5 and the support body 4. The damping opening 18 joins the working chamber 1 and the compensating chamber 16. The latter is closed toward the exterior by a bellows 17 and due to the great flexibility and elasticity of the bellows, it is suited for the pressureless reception of additional liquid. Applying the preload to be supported during the use in accordance with the object does, therefore, not cause a pressure increase in the interior of the working chamber in this embodiment of the rubber mounting. However, embodiments having a compensating chamber which is closed toward the exterior by means of a wall of a certain elasticity are also possible. In the represented embodiment, the damping opening 18 is disposed in the wall of the casing 6 and has a channel-like configuration. Its cross section is adjusted to the elasticity of the expanding spring such that when vibrations of a frequency to be damped are introduced the liquid contained therein is made to resonate and, consequently, this results in a particularly good damping action. The occurrence of vibrations of the supported machine part of an excessively high amplitude are thus suppressed.

The following explains the functioning:

The introduction of acoustically interfering vibration which must be damped during the use in accordance with the object causes a rocking relative displacement of the support body 4 with respect to the casing 6 of the represented rubber mounting. In the area of its external diameter the expanding spring 5 is attached to the casing and in the area of its internal diameter to the support body 4. Hence, it can only partially follow the relative displacement of the support body 4 or the casing 6 and not in its entirety. In FIG. 1, the resulting additional piston surface which affects the liquid contained in the working chamber 1 was accordingly indicated with F 2.

The plate 3 which is directly opposed to the support body 4 and the expanding spring 5 and can be exposed to a rocking relative movement has a substantially larger extension. In FIG. 2 its additional piston surface bears the reference numeral F 1. In case of a relative displacement of the support body 4 this plate permits compensating the liquid displaced by this support body and, proportionately, the expanding spring through a comparatively small relative movement. With respect to compensating pressure changes caused by the introduction of acoustically interfering vibrations and, particularly, by the introduction of structure-borne noise, the plate 3 hence remains in an area where the permanent magnet 8 and the magnetic coil can develop a high efficiency. Corresponding vibrations are thus insulated in the rubber mounting to an extent which has not been achieved previously.

The magnetic coil 9 can be activated as follows whereby the capacitor 13 and the ohmic resistor 14 fulfill the following function:

An alternating voltage for generating the current in the coil is applied to the clamps of the coil. Since the impedance to the alternating current rises with an increasing frequency, the inductance of the coil preferably is not too high, preferably ($L<10mH$). Providing the coil with additional passive components, it is possible to affect the dependency of the alternating current impedance upon the frequency. A capacitor in parallel to the coil forms together with the latter a blocking circuit. In the vicinity of the resonant frequency, the power demand in the feed line is decreased. An ohmic resistor in series with the coil reduces the dependency of the transmission properties of the magnetic system upon the frequency.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Hydraulically damped rubber mounting comprising:
   a plate made of a magnetizable material;
   a first spring;
   a liquid-filled working chamber bounded in at least a first partial area by said plate braced by said spring;
   a support body and an expanding spring which can widen and is made of an elastomeric material bounding said working chamber in at least a second partial area;
   a rigidly configured casing bounding said working chamber at least in a third partial area;
   a magnetic system including a permanent magnet and a magnetic coil for moving the plate back and forth in the direction of the working chamber, the permanent magnet and the magnetic coil being inflexible with respect to one another and rigidly disposed with respect to the casing;
   the permanent magnet and the magnetic coil forming together a lifting magnet which uses the plate as a magnetic short circuit and the rigidity of the first spring being greater than that of the expanding spring, while in any operative state, there is an air gap between the lifting magnet and the plate.

2. Rubber mounting in accordance with claim 1, in which the permanent magnet is provided with a magnetic reluctance which is at least 5 times as high as the magnetic reluctance of a gap formed by a spacing A between the plate and the permanent magnet.

3. Rubber mounting in accordance with claim 1, in which the permanent magnet has an energy density of at least 100 kJ/m$^3$.

4. Rubber mounting in accordance with claim 1, in which the magnetic coil has an inductance of 10 mH, at a maximum.

5. Rubber mounting in accordance with claim 1, in which the lifting magnet has soft magnetic parts of low retentivity and that the parts have a specific, electric resistance of at least 30$\mu\Omega$ cm.

6. Rubber mounting in accordance with claim 1, in which the plate has a specific electric resistance of at least 30$\mu\Omega$ cm.

7. Rubber mounting in accordance with claim 1, in which the plate has a thickness which is selected such that saturation inductance during use is not reached.

8. Rubber mounting in accordance with the claim 1, in which the spring and the force action of the permanent magnet complete one another so as to form one spring unit with a total spring rigidity which is at least twice as high as the rigidity of the expanding spring.

9. Rubber mounting in accordance with claim 8, in which the plate has an inertial mass which together with the total rigidity of the one spring unit forms a vibratory system having a resonant frequency which is above the frequency of the vibrations to be insulated.

10. Rubber mounting in accordance with claim 1, in which the plate has an additional piston surface which is at least 0.5 times as large as an additional piston surface of the support body inclusive of the expanding spring.

11. Rubber mounting in accordance with claim 1, in which the plate has an additional piston surface which is at least 1.5 times as large as an additional piston surface of the support body inclusive of the expanding spring.

12. Rubber mounting in accordance with claim 1, which includes a capacitor electrically connected in parallel to the magnetic coil.

13. Rubber mounting in accordance with claim 1, which includes an ohmic resistor electrically connected in series to the magnetic coil.

* * * * *